(12) United States Patent
Takeshita et al.

(10) Patent No.: US 7,485,394 B2
(45) Date of Patent: Feb. 3, 2009

(54) BATTERY HAVING A CASE WITH AN IDENTIFICATION RECESS AND GUIDE GROOVES FOR COUPLING TO AN ELECTRONIC DEVICE

(75) Inventors: Toshio Takeshita, Kanagawa (JP); Kei Tashiro, Kanagawa (JP); Takashi Kondou, Aichi (JP); Yoshihito Tamesue, Aichi (JP); Yoichi Miyajima, Tokyo (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 10/545,812

(22) PCT Filed: Dec. 24, 2004

(86) PCT No.: PCT/JP2004/019776

§ 371 (c)(1),
(2), (4) Date: Aug. 16, 2005

(87) PCT Pub. No.: WO2005/064706

PCT Pub. Date: Jul. 14, 2005

(65) Prior Publication Data

US 2006/0068280 A1 Mar. 30, 2006

(30) Foreign Application Priority Data

Dec. 26, 2003 (JP) ............................. 2003-433691

(51) Int. Cl.
*H01M 2/02* (2006.01)
(52) U.S. Cl. ...................................... 429/179; 429/163
(58) Field of Classification Search ................. 429/163, 429/179
See application file for complete search history.

(56) References Cited

U.S. PATENT DOCUMENTS

| 5,415,947 | A | * | 5/1995 | Mitsui et al. | ................... | 429/1 |
| D362,424 | S | | 9/1995 | Sumita et al. | | |
| 5,510,205 | A | | 4/1996 | Ozer | | |
| 5,626,979 | A | * | 5/1997 | Mitsui et al. | ................... | 429/97 |
| 5,672,441 | A | * | 9/1997 | Aoki et al. | ................... | 429/97 |

(Continued)

FOREIGN PATENT DOCUMENTS

CN 1112736 A 11/1995

(Continued)

*Primary Examiner*—Mark Ruthkosky
(74) *Attorney, Agent, or Firm*—Oblon, Spivak, McClelland, Maier & Neustadt, P.C.

(57) ABSTRACT

A battery apparatus and an electronic equipment are provided which permit the use of a plurality of types of battery apparatuses that differ in capacity, and are advantageous in improving ease of use. A case of a battery apparatus has a main body portion and a bottom portion disposed at one side in a thickness direction at the midpoint in a width direction of the main body portion. Portions on both sides in the width direction of the case are formed as flat side surfaces that are parallel to each other and extend in a length direction. A plane on one side in the thickness direction of the case is formed as a flat bottom surface. At portions of the case on both sides in the width direction, guide grooves are formed which extend in the length direction and engage projections disposed at a battery housing chamber thereby to position the position of the case in the thickness direction within the battery housing chamber.

24 Claims, 12 Drawing Sheets

U.S. PATENT DOCUMENTS

| | | |
|---|---|---|
| D417,861 S | 12/1999 | Maeyama |
| D425,479 S | 5/2000 | Melnicoff |
| 6,521,370 B1 * | 2/2003 | Takeshita et al. ............... 429/96 |
| 6,524,370 B2 * | 2/2003 | Maheshwary et al. ......... 95/101 |
| D473,186 S | 4/2003 | Grosfeld et al. |
| D515,499 S | 2/2006 | Matsuda et al. |
| 2002/0012831 A1 | 1/2002 | Takeshita et al. |
| 2004/0058231 A1 | 3/2004 | Takeshita et al. |
| 2004/0152365 A1 | 8/2004 | Ebine |

FOREIGN PATENT DOCUMENTS

| | | |
|---|---|---|
| EP | 0 595 354 B1 | 5/1994 |
| EP | 0 653 817 B1 | 5/1995 |
| EP | 0 676 819 B1 | 10/1995 |
| EP | 0 694 980 A2 | 1/1996 |
| EP | 0 707 350 B1 | 4/1996 |
| EP | 1 030 385 B1 | 8/2000 |
| EP | 1 033 766 A1 | 9/2000 |
| EP | 1 071 147 A1 | 1/2001 |
| EP | 1 076 370 B1 | 2/2001 |
| JP | 55-93686 | 7/1980 |
| JP | 62-140669 | 9/1987 |
| JP | 155654/1989 | 10/1989 |
| JP | 4-10957 | 1/1992 |
| JP | 4-115769 | 4/1992 |
| JP | 40462/1992 | 4/1992 |
| JP | 6-132022 | 5/1994 |
| JP | 6-104017 | 6/1994 |
| JP | 07-113855 | 5/1995 |
| JP | 7-230842 | 8/1995 |
| JP | 07-312212 | 11/1995 |
| JP | 7-335186 | 12/1995 |
| JP | 7-335187 | 12/1995 |
| JP | 8-50891 | 2/1996 |
| JP | 8-77991 | 3/1996 |
| JP | 9-55196 | 2/1997 |
| JP | 09-330741 | * 12/1997 |
| JP | 10-64494 | 3/1998 |
| JP | 11-97107 | 4/1999 |
| JP | 2000-89850 | 3/2000 |
| JP | 2000-243361 | 9/2000 |
| JP | 2000-323123 | * 11/2000 |
| JP | 2002-63876 | 2/2002 |
| JP | 2002-110287 | 4/2002 |
| JP | 2002-134196 | 5/2002 |
| JP | 2003-77443 | 3/2003 |
| JP | 2003-038828 | 7/2003 |
| JP | 2005-190929 | 7/2005 |

* cited by examiner

BATTERY HAVING A CASE WITH AN IDENTIFICATION RECESS AND GUIDE GROOVES FOR COUPLING TO AN ELECTRONIC DEVICE

TECHNICAL FIELD

The present invention relates to a battery apparatus and an electronic equipment operable by the battery apparatus.

BACKGROUND ART

As a battery apparatus mountable on an electronic equipment, there is provided one which is provided with a case having a predetermined width, thickness and length, a battery cell housed in the inside of the case, and a battery-side terminal disposed at the surface of the case and electrically connected to the battery cell, and which is inserted into a battery housing chamber of the electronic equipment in the direction of the length so that the battery-side terminal makes connection with a housing chamber-side terminal of the battery housing chamber (see for example Japanese Patent No. 2508447).

However, in the above-mentioned battery apparatus and the electronic equipment, if a battery apparatus having a smaller contour dimension than the shape of a battery housing chamber is inserted into the battery housing chamber, the battery apparatus is unstable in the battery housing chamber, thus failing to use suitably. That is, there is the disadvantage that it is impossible to selectively use a plurality of types of battery apparatuses having different contour dimensions, namely, different capacities.

DISCLOSURE OF THE INVENTION

The present invention provides a battery apparatus and an electronic equipment in which it is able to use a plurality of types of battery apparatuses having different capacities and are advantageous in improving ease of use.

To achieve the above-mentioned advantage, a battery apparatus according to an embodiment of the present invention includes a case having a predetermined width, thickness and length, a battery cell housed in the inside of the aforesaid case, and a battery-side terminal disposed at the surface of the aforesaid case and electrically connected to the aforesaid battery cell. The aforesaid battery apparatus is inserted into a battery housing chamber of the electronic equipment in the direction of the aforesaid length so that the aforesaid battery-side terminal makes connection with a housing chamber-side terminal of the aforesaid battery housing chamber. At portions of the aforesaid case on both sides in the direction of the aforesaid width, there are formed guide grooves that extend in the direction of the aforesaid length and engage projections disposed at the aforesaid battery housing chamber thereby to position the position of the aforesaid case in the direction of the aforesaid thickness within the aforesaid battery housing chamber.

Electronic equipment of the present invention is an electronic equipment having a battery housing chamber in which a battery apparatus is housed. The aforesaid battery apparatus includes a case having a predetermined width, thickness and length, a battery cell disposed at the inside of the aforesaid case, and a battery-side terminal disposed at the surface of the aforesaid case and electrically connected to the aforesaid battery cell. The aforesaid battery housing chamber has a width corresponding to the width of the aforesaid case, a height corresponding to the thickness of the aforesaid case, a depth corresponding to the length of the aforesaid case, and a housing chamber-side terminal that connects with the aforesaid battery-side terminal in the state in which the aforesaid battery apparatus is inserted by keeping the direction of the aforesaid length parallel with the direction of the aforesaid depth. Guide grooves extending in the direction of the aforesaid length direction are disposed at portions on both sides in the direction of the aforesaid width of the aforesaid case of the aforesaid battery apparatus. Projections are disposed at the aforesaid battery housing chamber which engage the aforesaid guide grooves and position the position in the direction of the aforesaid thickness of the aforesaid case in the direction of the aforesaid height direction within the aforesaid battery housing chamber.

BEST MODE FOR CARRYING OUT THE INVENTION

Figure 1:
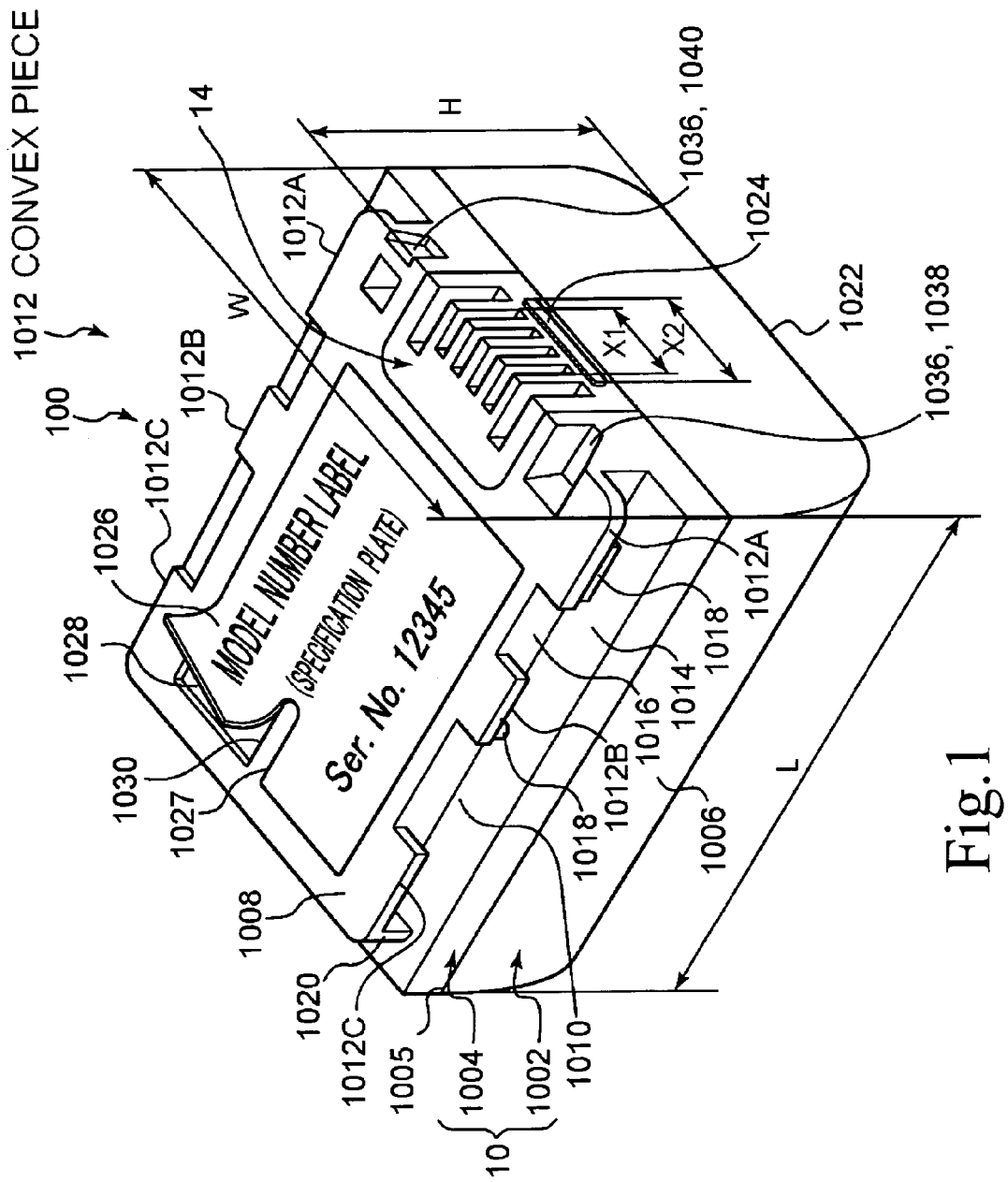
FIG. 1 is a perspective view taken from the bottom of a battery apparatus in an embodiment of the present invention.

The advantage of making possible the use of a plurality of types of battery apparatuses which differ in capacity is realized by disposing guide grooves at a battery apparatus and disposing projections at a battery housing chamber of the electronic equipment.

An embodiment of the present invention will next be described by referring to the drawings.

In this embodiment, a description will be made of a case where a battery apparatus of the present invention is mounted for use on an imaging apparatus as an electronic equipment.

Figure 2:
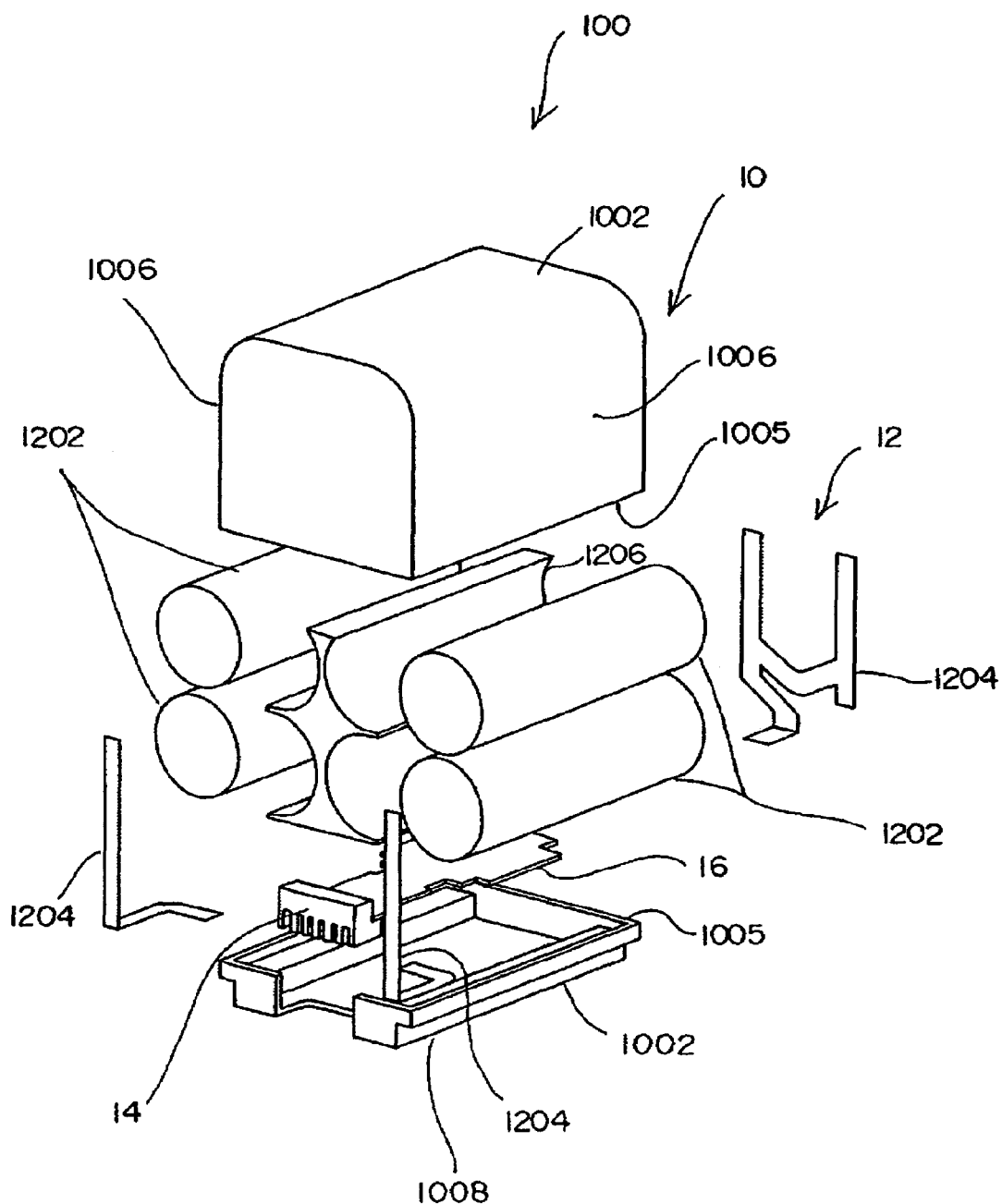
FIG. 2 is a disassembled perspective view illustrating the construction of the battery apparatus an embodiment.

FIG. 1 is a perspective view taken from the bottom of a battery apparatus of the first preferred embodiment. FIG. 2 is a disassembled perspective view illustrating the construction of the battery apparatus of the first preferred embodiment.

First, a description of the battery apparatus will be presented.

As shown in FIG. 1, a battery apparatus 100 has a case 10, a chargeable battery section 12 (see FIG. 2) disposed at the inside of the case 10, a control circuit board 16 disposed at the inside of the case 10, and a battery-side terminal 14 disposed at the case 10.

The case 10 has a main body portion 1002 that is uniform in the dimension in a width direction W and extend in a length direction L, and a bottom portion 1004 that is disposed at the midpoint in the width direction W of the main body portion 1002 on one side in a thickness direction H, and extends in the length direction L in a uniform width of a dimension smaller than the width of the main body portion 1002.

A battery-side terminal 14 is disposed at one end in the length direction L of the bottom portion 1004.

In this embodiment, the case 10 includes a first segment excluding the portion toward the bottom portion 1004 of the main body portion 1002 and the bottom portion 1004, and a second segment including the portion toward the bottom portion 1004 of the main body portion 1002 and the bottom portion 1004. These segments are mated with a mating surface 1005 to form the case 10. The chargeable battery section 12 and the control circuit board 16 are housed in the inside of these segments.

As shown in FIG. 2, the chargeable battery section 12 has four cylindrical battery cells 1202, a plurality of wiring members 1204 for connecting the electrodes of these respective battery cells 1202, and a holding member 1206 interposed between the side surfaces of the respective battery cells 1202.

The control circuit board 16 is connected via the wiring members 1204 to the electrodes of the respective battery cells 1202 such that it is attached to the chargeable battery section 12. The control circuit board 16 has a microcomputer containing a CPU, a RAM and a ROM, an interface, etc, and is configured to execute data communication with an external electronic equipment via the battery-side terminal 14. The data communication includes the output operation of identification data indicating the capacity and the characteristic of the battery apparatus 100. Examples of the identification data are data indicating whether quick charge is possible or not when mounted on a battery charger, and data indicating an appropriate charging current value or an upper limit value of charging current.

The battery-side terminal 14 is, at the inside of the case 10, attached to the control circuit board 16 thereby to become conductive to the electrodes of the battery cells 1202 via the respective wiring members 1204, so that there are performed, via the battery-side terminal 14, the supply of operating current from the respective battery cells 1202 to the external electronic equipment, or the supply of charging current from the battery charger to the respective battery cells 1202.

The number and the shape of the battery cells 1202 constituting the chargeable battery section 12, of course, vary according to the capacity and the characteristic of the battery apparatus 100.

Description will now be made in detail of the construction of the case 10.

Figure 3:
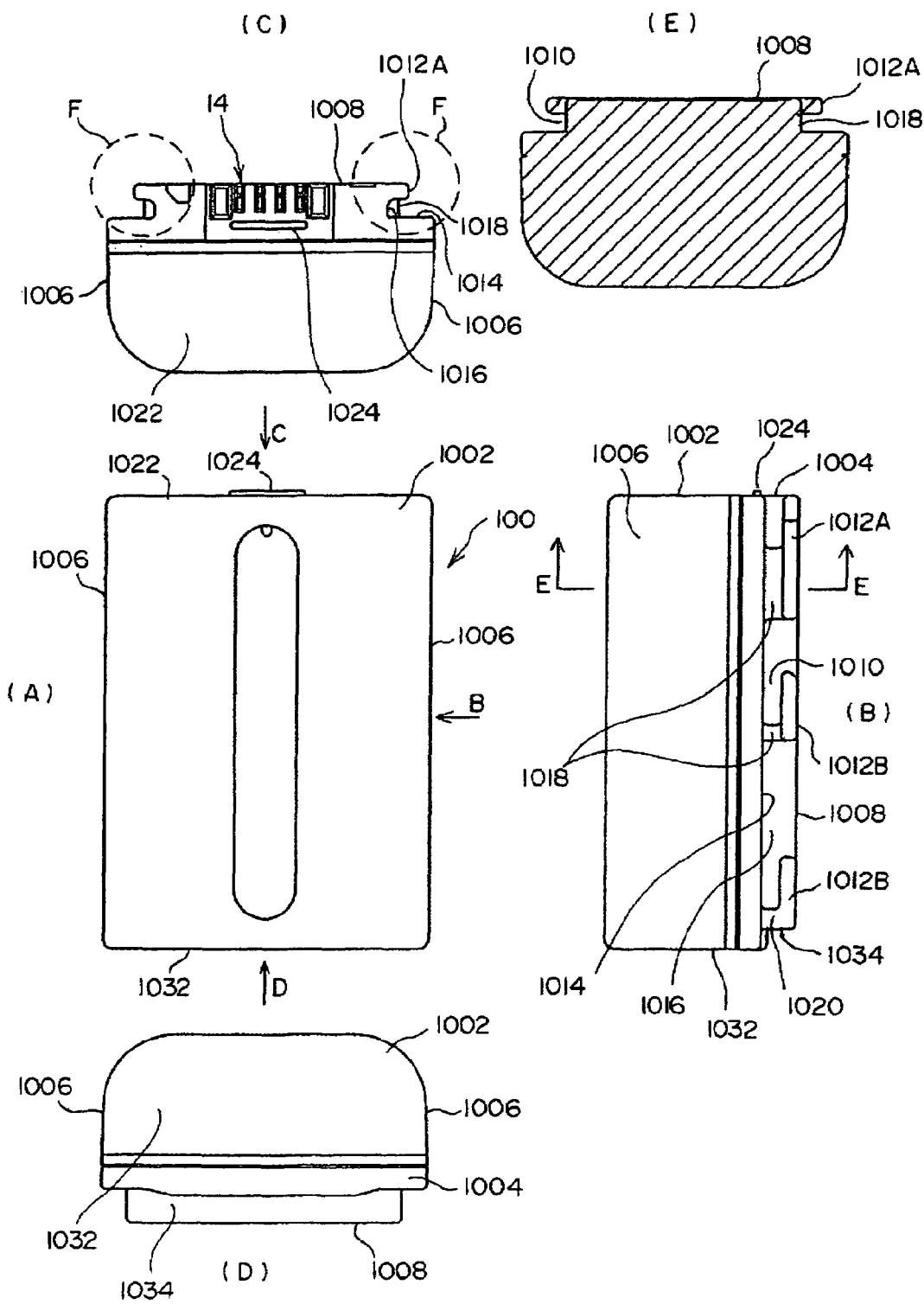
FIG. 3 is an explanatory drawing of a battery apparatus 100.
Figure 4A:
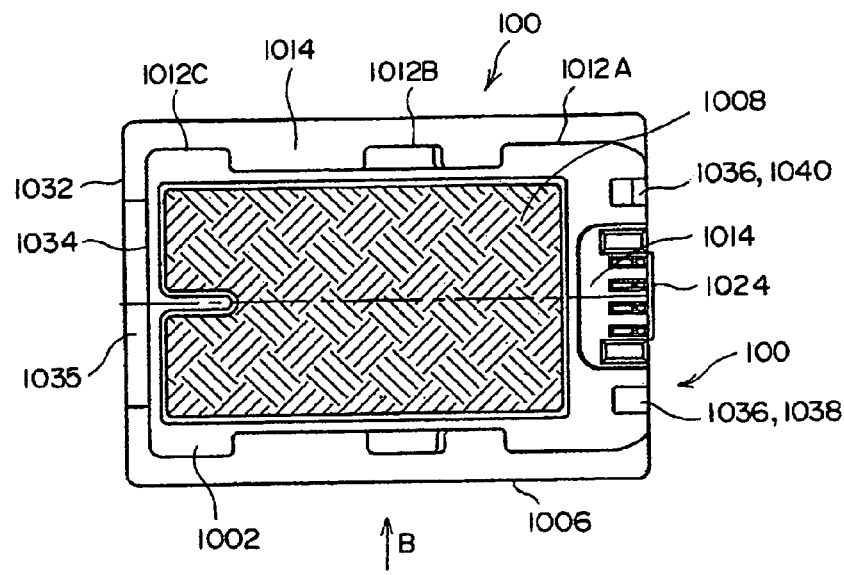
FIG. 4 is an explanatory drawing of a battery apparatus 100.
Figure 4B:
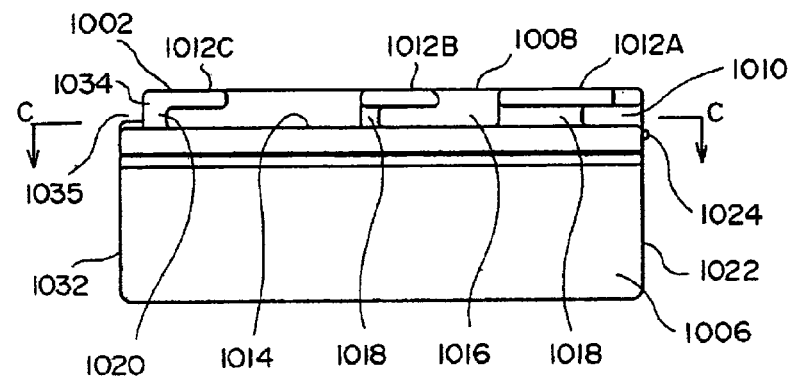
Figure 4C:
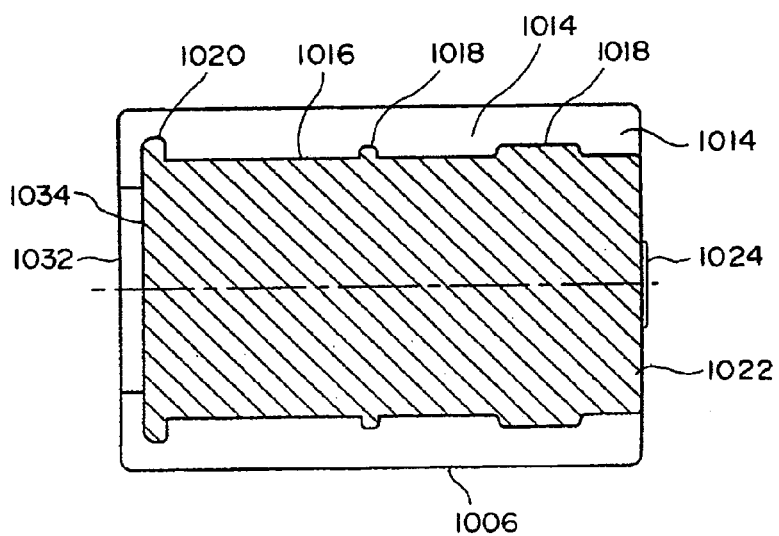
Figure 5:
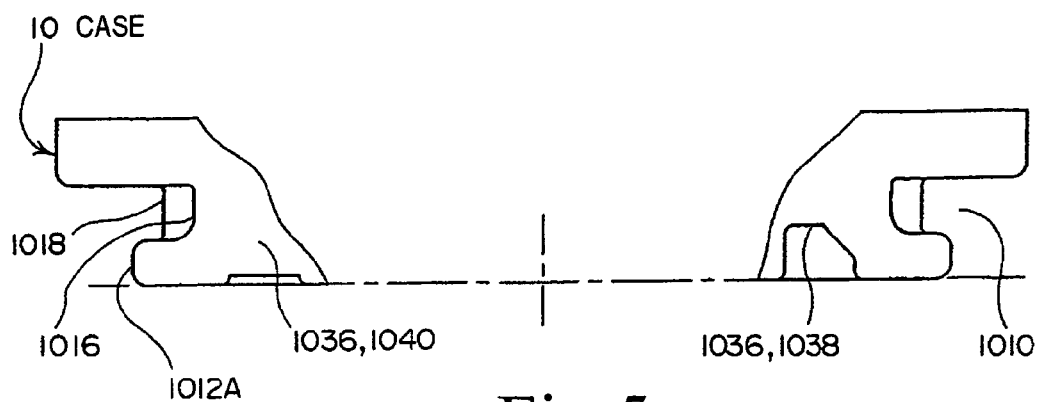
FIG. 5 is an enlarged view of an important part in FIG. 3.
Figure 6:
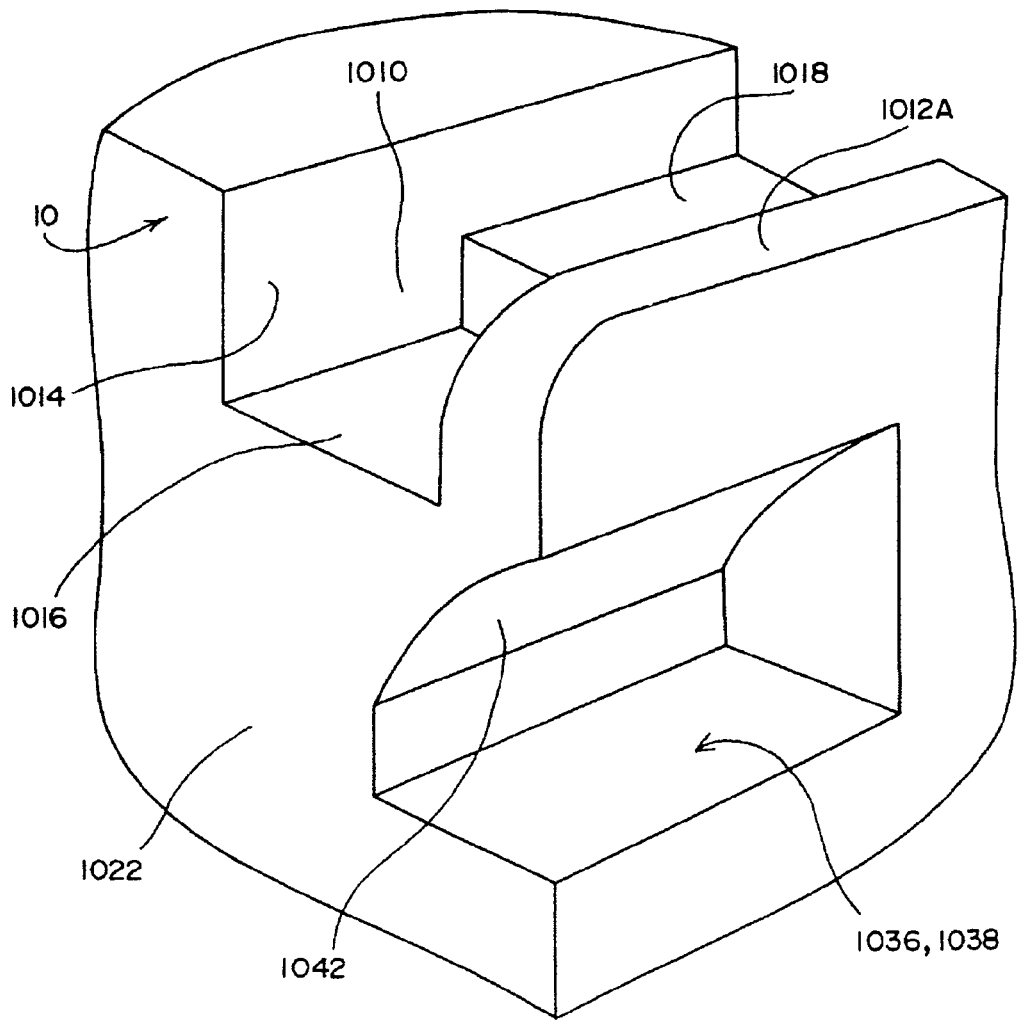
FIG. 6 is an enlarged perspective view of an identification section 1036 and its surroundings.

FIG. 3A is a plan view of the battery apparatus 100, FIG. 3B is a view taken in the direction of arrow B in FIG. 3A, FIG. 3C is a view taken in the direction of arrow C in FIG. 3A, FIG. 3D is a view taken in the direction of arrow D in FIG. 3A, and FIG. 3E is a sectional view taken along the line E-E in FIG. 3B. Further, FIG. 4A is a bottom view of the battery apparatus 100, FIG. 4B is a view taken in the direction of arrow B in FIG. 4A, and FIG. 4C is a sectional view taken along the line C-C in FIG. 4B. FIG. 5 is an enlarged view of a portion indicated by F in FIG. 3C. FIG. 6 is an enlarged perspective view of an identification section 1036 and its surroundings.

As shown in FIGS. 2, 3, and 4A to 4B, the portions on both sides in the width direction W of the case 10 are formed as flat side surfaces 1006 that are parallel to each other and extend in the length direction L. One plane in the thickness direction H of the case 10 is formed as a flat bottom surface 1008. In this embodiment, the side surfaces on both sides in the width direction W of the main body portion 1002 constitute the side surfaces 1006, and the bottom surface of the bottom portion 1004 constitutes the bottom surface 1008.

At portions of the case 10 on both sides in the width direction W, there are formed guide grooves 1010 that extend in a length direction L and engage projections disposed at a battery housing chamber of the electronic equipment thereby to position the position of the case 10 in the thickness direction H within the battery housing chamber.

In this embodiment, the guide grooves 1010 are disposed at portions toward the bottom surface 1008. More specifically, a plurality of convex pieces 1012 (1012A, 1012B and 1012C) are formed at the bottom surface 1008 on both sides in the width direction W such that they project outwardly in the width direction W from a plurality of portions at spaced intervals in the length direction L. The portions of the convex pieces 1012 (1012A, 1012B and 1012C) positioned at the end portion on one side in the thickness direction H are formed as a bottom surface arranged flush with the bottom surface 1008.

The guide grooves 1010 are formed so as to extend in the length direction of the case 10 and in its open state on the outside in the width direction by using the plurality of convex pieces 1012 (1012A, 1012B and 1012C), a plane 1014 on which the main body portion 1002 faces the bottom portion 1004, and side surfaces 1016 of the bottom portion 1004 which are positioned on both sides in the width direction W. In this embodiment, the guide grooves 1010 are opened toward the bottom surface 1008 at portions between the convex pieces 1012A, 1012B, and 1012C.

In this embodiment, at portions of the side surfaces 1016 of the bottom portion 1004 which are spaced apart in the length direction L, there are disposed convex portions 1018 projecting outwardly in the width direction W from the side surfaces 1016. The convex portions 1018 are formed in a projected dimension smaller than the convex pieces 1012.

Further in this embodiment, the convex portions 1018 are disposed at portions corresponding to the convex pieces 1012A and 1012B, respectively, so that the convex pieces 1012A and 1012B, the plane 1014, and the side surfaces 1016 are connected to one another.

In addition, stopper walls 1020 for filling the guide grooves 1010 are disposed at portions of the bottom surface 1008 which are on the opposite side of the portion at which the battery-side terminal 14 is disposed.

In addition, the stopper walls 1020 are disposed at the portion corresponding to the convex piece 1012C, so that the convex piece 1012C, the plane 1014, and the side surfaces 1016 are connected to one another.

Further in this embodiment, as shown in FIG. 1, the end surfaces of the main body portion 1002 and the bottom portion 1004 on the side on which the battery-side terminal 14 is disposed, which is one of the end surfaces on both ends in the length direction L of the case 10, are formed as a flat end surface 1022 orthogonal to the bottom surface 1008. A convex portion 1024, which is uniform in the dimension in the thickness direction H, and extends linearly in the width direction W, is formed so as to swell at a portion apart in the thickness direction H from the battery-side terminal 14 of the end surface 1022. The convex portion 1024 is formed at the portion corresponding to the battery-side terminal 14 and in a length X2 having a greater dimension than a length X1 of the portion at which at least the electrodes of the battery-side terminal 14 are disposed.

Additionally, as shown in FIG. 1, a recess portion 1028 is formed at the bottom surface 1008, and a machine name plate 1026 is affixed to the recess portion 1028. The surface of the machine name plate 1026 is flush with the bottom surface 1008, or the surface of the machine name plate 1026 is arranged to position toward the inside of the case 10 from the bottom surface 1008. A positioning convex portion 1030 arranged flush with the bottom surface 1008 is formed in the length direction L from the portion positioned on the opposite side of the battery-side terminal 14 in the length direction L of the recess portion 1028. The convex portion 1030 is inserted into a positioning groove 1027 of the machine name plate 1026.

As shown in FIGS. 4A and 4B, the end surface of the main body portion 1002 positioned on the opposite side of the battery-side terminal 14, which is one of the end surfaces of both ends in the length direction L of the case 10, is formed as a flat end surface 1032 orthogonal to the bottom surface 1008, and the end surface of the bottom portion 1004 positioned on the opposite side of the battery-side terminal 14 is formed as a flat end surface 1034 that is parallel to the end surface 1032, at a portion displaced toward the inside of the case 10 from the end surface 1032. Accordingly, the end surfaces 1032 and 1034 constitute a cutout portion 1035 at a boundary portion between the main body portion 1002 and the bottom portion 1004, which are at the end portion positioned on the opposite side of the battery-side terminal 14 in the length direction L of the case 10.

As shown in FIG. 1, FIG. 5 and FIG. 6, two identification sections 1036 are formed at portions on both sides of the bottom surface 1008 of the bottom portion 1004 which sandwich therebetween the battery-side terminal 14 in the width direction W. These identification sections 1036 are formed as recess portions 1038 that are opened in the thickness direction H and the length direction L, or as recess portions 1040 that are opened in the thickness direction H and blocked in the length direction L. The identification sections 1036 are identified by identification means disposed on the electronic equipment side, and this identification is based on the shape of the recess portions 1038 and 1040, and the dimension in the length direction L of the recess portions 1038.

A plane portion in the vicinity of the recess portion 1010 of planes constituting the recess portion 1038 is made in an inclined surface 1042 so as to ensure a wall thickness dimension between the guide groove 1010 and the recess portion 1038, thereby ensuring the mechanical strength of the convex piece 1012A.

Electronic equipment will next be described.

In this embodiment, an electronic equipment is an imaging apparatus 200. The imaging apparatus 200 includes a case, an optical system incorporated into a front portion of the case, an imaging device for imaging an image of a subject captured by the optical system, a liquid crystal display section for displaying an image taken by the imaging device, a recording/reproducing section for recording and/or reproducing an image taken by the imaging device in a record medium, and a battery apparatus for supplying power to the imaging device, the liquid crystal display section, and the recording/reproducing section.

The case is provided with a battery housing chamber on which the battery apparatus 100 is removably mounted. The battery housing chamber is disposed so as to open in a rear surface of the case, and the opening is blocked with a cover plate (not shown).

Figure 7:
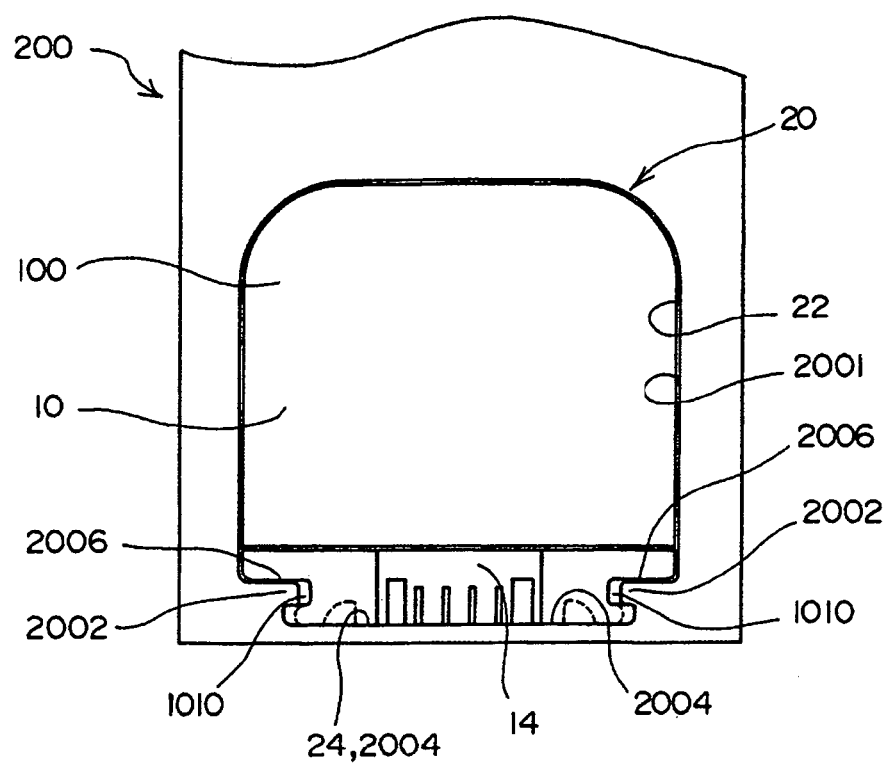
FIG. 7 is a sectional view of a battery housing chamber 20 of a case.
Figure 8:
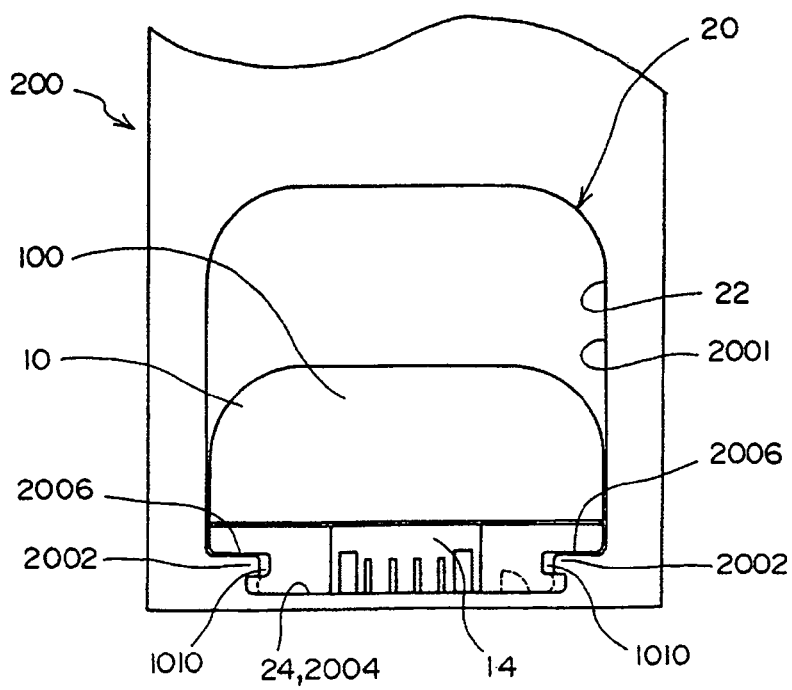
FIG. 8 is a sectional view of a battery housing chamber 20 of a case.

FIGS. 7 and 8 are sectional views of a battery housing chamber 20 of the case. The battery housing chamber 20 has a width corresponding to the width W of the case 10 of the battery apparatus 100, a height corresponding to the thickness of the case 10, and a depth corresponding to the length of the case 10.

At a back portion in the depth direction of the battery housing chamber 20, there is disposed a housing chamber-side terminal (not shown) making connection with the battery-side terminal 14 in the state in which the battery apparatus 100 is inserted by keeping the length direction L parallel with the depth direction.

In addition, the battery housing chamber 20 is provided with projections 2002 that engage the guide groove 1010 and position the position in the thickness direction H of the case 10 in the height direction within the battery housing chamber 20.

In this embodiment, the battery housing chamber 20 has a main body portion 22 that is uniform in the dimension in the width direction and extend in a depth direction, and a bottom portion 24 that is disposed at the midpoint in the width direction of the main body portion 22 on one side in the height direction, and extends in the depth direction in a uniform width of a dimension smaller than the width of the main body portion 22.

One plane in the height direction of the battery housing chamber 20 is formed by the plane of the bottom portion 24, as a flat bottom surface 2004.

At portions of the boundary between the main body portion 22 and the bottom portion 24 which are on both sides in the width direction, there are disposed intermediate mounting surfaces 2006 that are parallel to the bottom surface 2004 and extend in the depth direction.

The projections 2002 are projected in the direction in which they approach each other from portions on the both sides at which the intermediate mounting surfaces 2006 are opposed to each other. In other words, the projections 2002 are disposed at portions toward the bottom surface 2004 on the side surfaces 2001 positioned on both ends in the width direction of the battery housing chamber 20.

One plane of the projection 2002 in the height direction is parallel to the bottom surface 2004, and the other plane in the height direction is arranged flush with the intermediate mounting surface 2006.

The height of the battery housing chamber 20 is dimensioned to hold a plurality of types of battery apparatuses 100 which differ in the thickness of the case 10, as shown in FIGS. 7 and 8.

Description will next be made of the operational effects of this embodiment.

When housing and holding the battery apparatus 100 at the battery housing chamber 200, the battery apparatus 100 is inserted into the battery housing chamber 20 by facing the battery-side terminal 14 of the battery apparatus 100 into the opening of the battery housing chamber 20, and facing the bottom surface 1008 of the battery apparatus 10 into the bottom surface 2004 of the battery housing chamber 20.

Upon this insertion, the projections 2002 of the battery housing chamber 20 are engaged to the guide grooves 1010 of the battery apparatus 100, so that the battery apparatus 100 in the height direction is positioned in the thickness direction H of the case 10 within the battery housing chamber 20.

In this embodiment, the bottom surface 1008 of the case 10 is mounted on the bottom surface 2004 of the battery housing chamber 20 with the projections 2002 engaged to the guide grooves 1010. The mounting of the bottom surface 1008 of the case 10 onto the bottom surface 2004 of the battery housing chamber 20 restricts the movement of the battery housing chamber 20 toward the bottom surface 2004. The engagement between the guide grooves 1010 and the projections 2002 of the battery housing chamber 20 restricts the movement of the battery apparatus 100 in the direction away from the bottom surface 2004 of the battery housing chamber 20. Alternatively, the engagement between the projections 2002 and the guide grooves 1010 may restrict both of the movement of the battery apparatus 100 toward the bottom surface 2004 of the battery housing chamber 20 and the movement of the battery apparatus 100 in the direction away from the bottom surface 2004 of the battery housing chamber 20.

In addition, with the engagement between the projections 2002 and the guide grooves 1010, the tips of the convex portions 1008 make connection with the tips of the projections 2004 and thereby to restrict the movement of the battery apparatus 100 in the width direction W. In another alternative, without providing connection between the tips of the convex portions 1018 and the tips of the projections 2004, the movement of the battery apparatus 100 in the width direction W may be restricted by providing connection between other portions of the battery apparatus 100 and portions of the battery housing chamber 20, such as between the side surfaces 1006 of the case 10 of the battery apparatus 100 and the side surfaces 2002 of the battery housing chamber 20.

Then, the battery apparatus 100 is inserted into the back portion of the battery housing chamber 20 thereby to provide connection between the battery-side terminal 14 of the battery apparatus 100 and the housing chamber-side terminal of the battery housing chamber 20.

Upon the insertion of the battery apparatus 100 into the back portion of the battery housing chamber 20, the above-mentioned opening is closed with a cover plate (not shown), thus terminating the loading of the battery apparatus 100 into the battery housing chamber 20.

The movement of the battery apparatus 100 in the length direction L is restricted by already known restricting means, such as the manner that one end surface 1022 of the case 10 abuts the wall surface of the back portion of the battery housing chamber 20, and the other end surface 1032 of the case 10 abuts the internal surface of the cover plate.

Thus, in accordance with the battery apparatus 100 of this embodiment, a plurality of types of battery apparatuses 100, which differ in the thickness of the case 10, can be housed in the battery housing chamber 20 because, at the portions of the case 10 on both sides in the width direction of the battery apparatus 100, there are formed the guide grooves 1010 that extend in the length direction L and engage the projections 2002 disposed at the battery housing chamber 200 thereby to position the position of the case 10 in the thickness direction H within the battery housing chamber 20.

In accordance with the imaging apparatus 200 of this embodiment, a plurality of types of battery apparatuses 100, which differ in the thickness of the case 10, can be housed in the battery housing chamber 20 because the battery housing chamber 20 is provided with the projections 2002 that engage the guide grooves 1010 of the battery apparatus 100 thereby to position the position in the thickness direction H of the case 10 in the height direction within the battery housing chamber 20.

Therefore, for example, when the imaging apparatus 200 is operated for a long period of time, the battery apparatus 100 having a large power capacity, namely, the battery apparatus 100 with the case 10 having a large dimension in the thickness direction H can be housed and held at the battery housing chamber 20. On the other hand, when the imaging apparatus 200 is operated for a short period of time, the battery apparatus 100 having a small power capacity, namely, the battery apparatus 100 with the case 10 having a small dimension in the thickness direction H can be housed and held at the battery housing chamber 20. Thus, the battery apparatus 100 can be selectively and suitably used depending on the application thereof, and hence it is advantageous in improving ease of use.

Further, in this embodiment the guide grooves 1010 are disposed at the portions of the battery apparatus 100 which are toward the bottom surface 1008, and the projections 2002 are disposed at the portions of the battery housing chamber 20 which are toward the bottom surface 2004. This is advantageous in reliably performing the positioning in the thickness direction H of the case 10 in the height direction within the battery housing chamber 20, even if the thickness of the battery apparatus 100 is extremely small.

In this embodiment, the stopper wall 1020 functions to prevent error insertion. Specifically, user can recognize immediately that the direction of the battery apparatus 100 is wrong because the stopper wall 1020 abuts the projection 2002 if the battery apparatus 100 is inserted into the battery housing chamber 20 in the wrong direction of insertion, namely, if inserted into the battery housing chamber 20 with the opposite side of the battery-side terminal 14 of the case 100 set in forward direction.

Additionally, in this embodiment, the convex portions 1018 are disposed at the portions corresponding to the convex pieces 1012A and 1012B, respectively, so that the convex pieces 1012A and 1012B, and the plane 1014 are connected to the side surfaces 1016, and hence it is advantageous in improving the mechanical strength of the convex pieces 1012A and 1012B by the two convex pieces 1018.

Further, the stopper wall 1020 is disposed at the portion corresponding to the convex piece 1012C so that the convex piece 1012C and the plane 1014 are connected to the side surfaces 1016, and hence it is advantageous in improving the mechanical strength of the convex piece 1012C by the stopper wall 1020.

In another alternative, with the position of the end surface 1022 of the case 10 as reference, it is able to determine whether the battery apparatus 100 is a normal product or not, based on the positions of the respective convex portions 1018 disposed in the length direction L (or based on the presence and absence of the respective convex portions 1018 or the number of the convex portions 1018).

Figure 9:
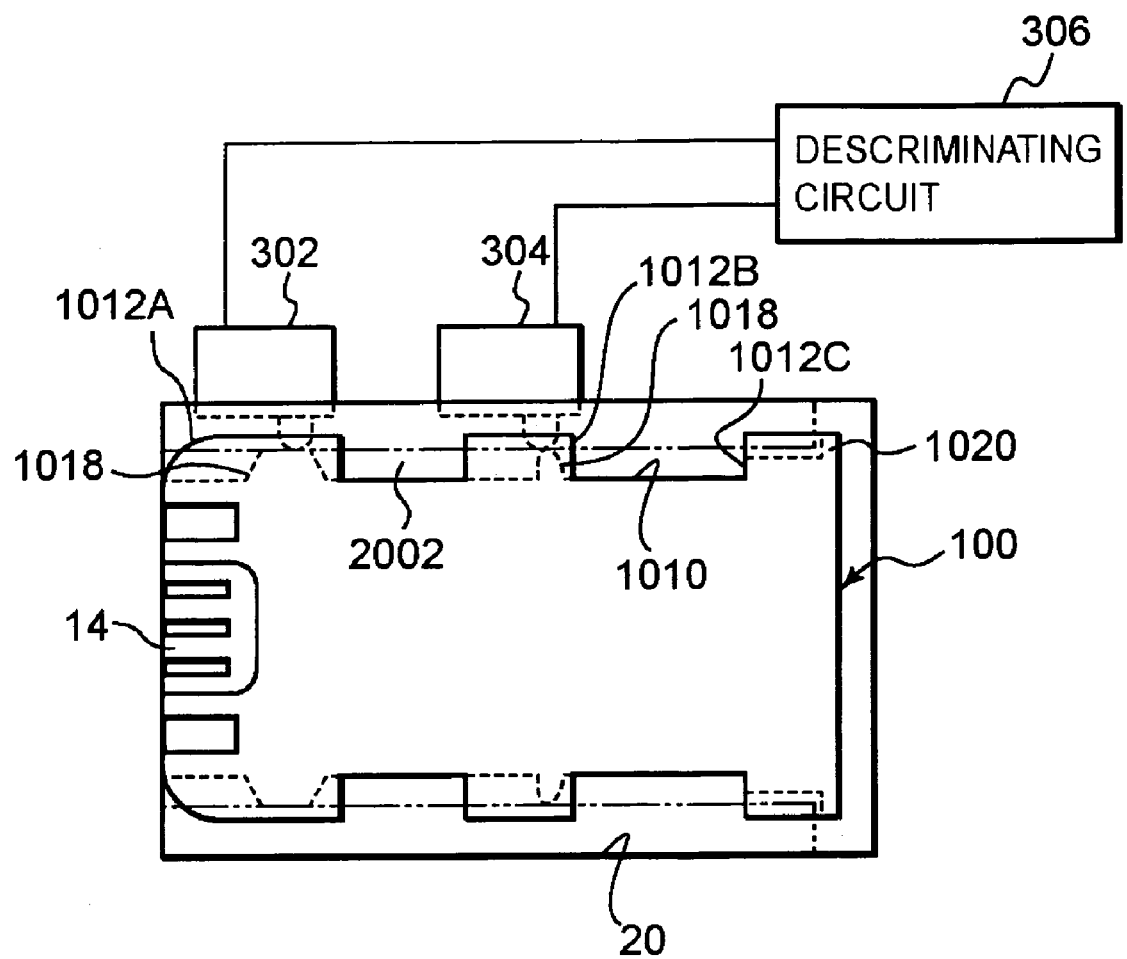
FIG. 9 is a block diagram illustrating a discriminating circuit of convex portions 1018.

For example, as shown in FIG. 9, sensors 302 and 304 are disposed at a battery housing chamber 20, each of which includes a microswitch for sensing the positions of the respective convex portions 1018 in the length direction L with the end surface 1022 of the case 10 as reference. There is also disposed a discriminating circuit 306 for discriminating whether the respective convex portions 1018 are positioned correctly, based on detecting signals from the respective sensors 302 and 304.

With this construction, based on the discriminating result of the discriminating circuit 306, the power supply from the battery apparatus 100 can be permitted only when the battery apparatus 100 is recognized as a normal product, and if not, the power supply from the battery apparatus 100 can be prohibited. This enables to prevent in advance the use of the battery apparatus 100 that is not a normal product.

In addition, the above-mentioned identification data of the battery apparatus 100 can be indicated by the positions of the respective convex portions 1018 disposed in the length direction L, or the presence and absence of the respective convex portions 1018, or the number of the convex portions 1018.

For example, in accordance with the construction shown in FIG. 9, four types of identification data can be indicated in a combination of ON and OFF of the two sensors 302 and 304. Needless to say, eight types of identification information are obtainable by disposing four sensors so as to detect the positions of a total of four convex portions 1018 disposed on both sides in the width direction of the case 10 of the battery apparatus 100.

Additionally, if used a sensor that can measure the position of the respective convex portions 1018 in the length direction with the end surface 1022 as reference, it is of course able to further increase the type of identification data detectable by the sensors.

In a case where the electronic equipment on which the battery apparatus 100 is mounted is a battery charger for executing charge to the battery apparatus 100, one or more sensors similar to the above-mentioned sensors 302 and 304 may be disposed at the battery charger such that they sense the presence and absence of the mounting of the battery apparatus 100, and the charging operation to the battery apparatus 100 is started in response to this sensing operation. In this construction, the sensors are disposed at the portions corresponding to the convex portions 1018, that is, the sensors are disposed in a direction orthogonal to the inserting direction of the battery apparatus 100. Therefore, as compared to the case where the sensor is disposed so as to face into the insertion direction of the battery apparatus 100 at the back portion of the battery housing chamber 20, there is the advantage that the sensors are unsusceptible to malfunction due to bar-shape foreign matter entered through the opening of the battery housing chamber 20.

Further, the characteristics of the battery apparatus 100 (such as an appropriate charging current value, or as to whether quick charge is possible or not) can be determined on the battery charger side by sensing the positions of the convex portions 1018 with the above-mentioned sensors.

Alternatively, a lock mechanism for providing engagement and removal with respect to part or all of the respective convex portions 1018 may be disposed at the battery housing chamber 20. The engagement between the lock mechanism and part or all of the convex portions 1018 is advantageous in reliably preventing the battery apparatus 100 from coming off the battery housing chamber 20.

In addition, as shown in FIG. 1, it is arranged such that the surface of the machine name plate 1026 is flush with the bottom surface 1008, or the surface of the machine name plate 1026 is positioned at the inside of the case 10 from the bottom surface 1008, and also the positioning convex portion 1030 arranged flush with the bottom surface 1008 is inserted into the positioning groove 1027 of the machine name plate 1026. Therefore, even if the bottom surface 1008 of the battery apparatus 100 and the bottom surface 2004 of the battery housing chamber 20 are worn off by loading and unloading the battery apparatus 100 with respect to the battery housing chamber 20, the surface of the machine name plate 1026 is unsusceptible to damage and dirt, and hence it is advantageous in protecting the surface of the machine name plate 1026.

In another alternative, the above-mentioned battery apparatus 100 is usable as so-called internal type in which it is housed in the battery housing chamber 20, as described in the foregoing preferred embodiment, as well as so-called exterior type in which it is attached to the exterior of the imaging apparatus 200 as described below.

Description will next be made of a case where the battery apparatus 100 is used as the exterior type.

Figure 10:
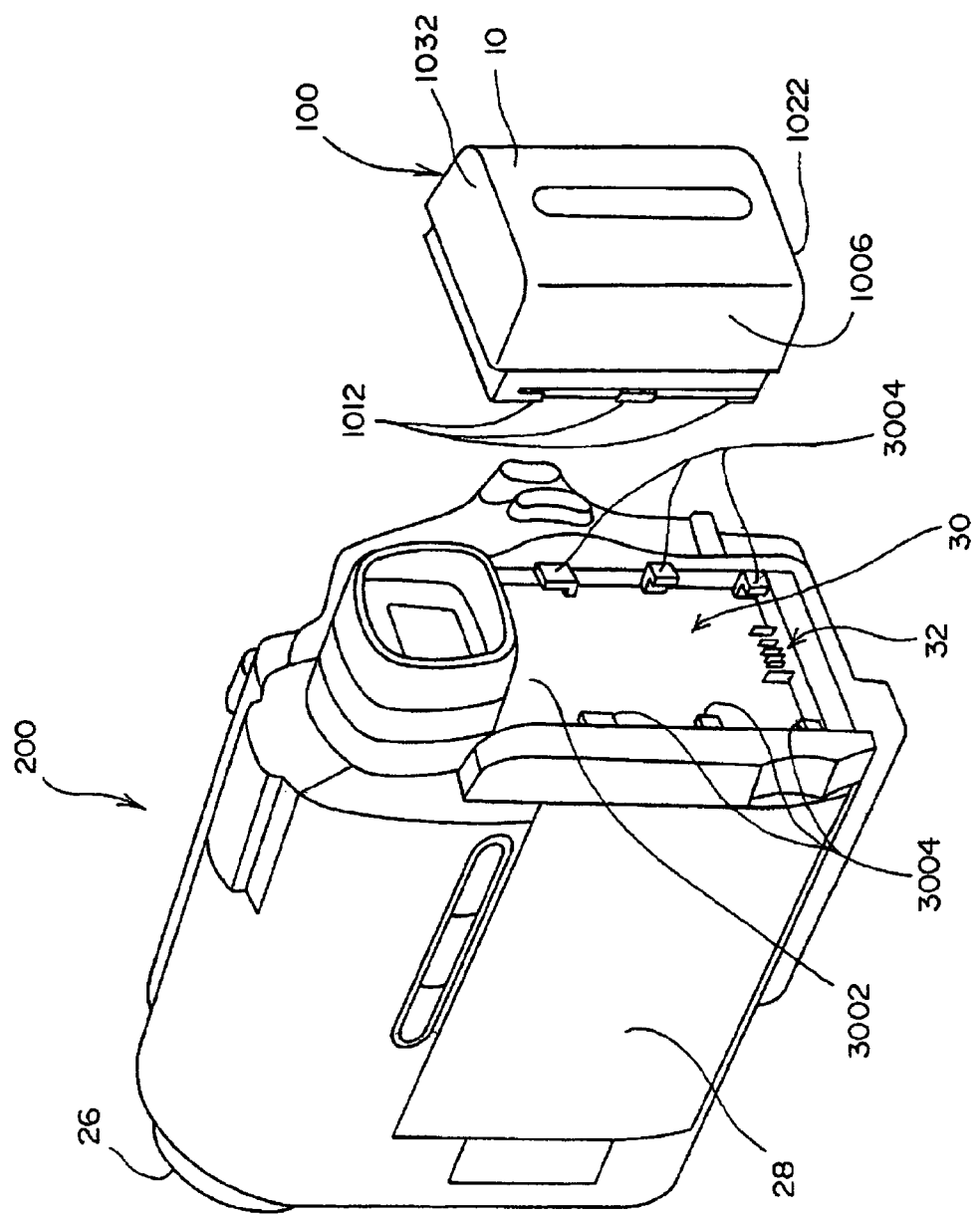
FIG. 10 is a perspective view of an imaging apparatus 200 to which the battery apparatus 100 is attached externally.
Figure 11:
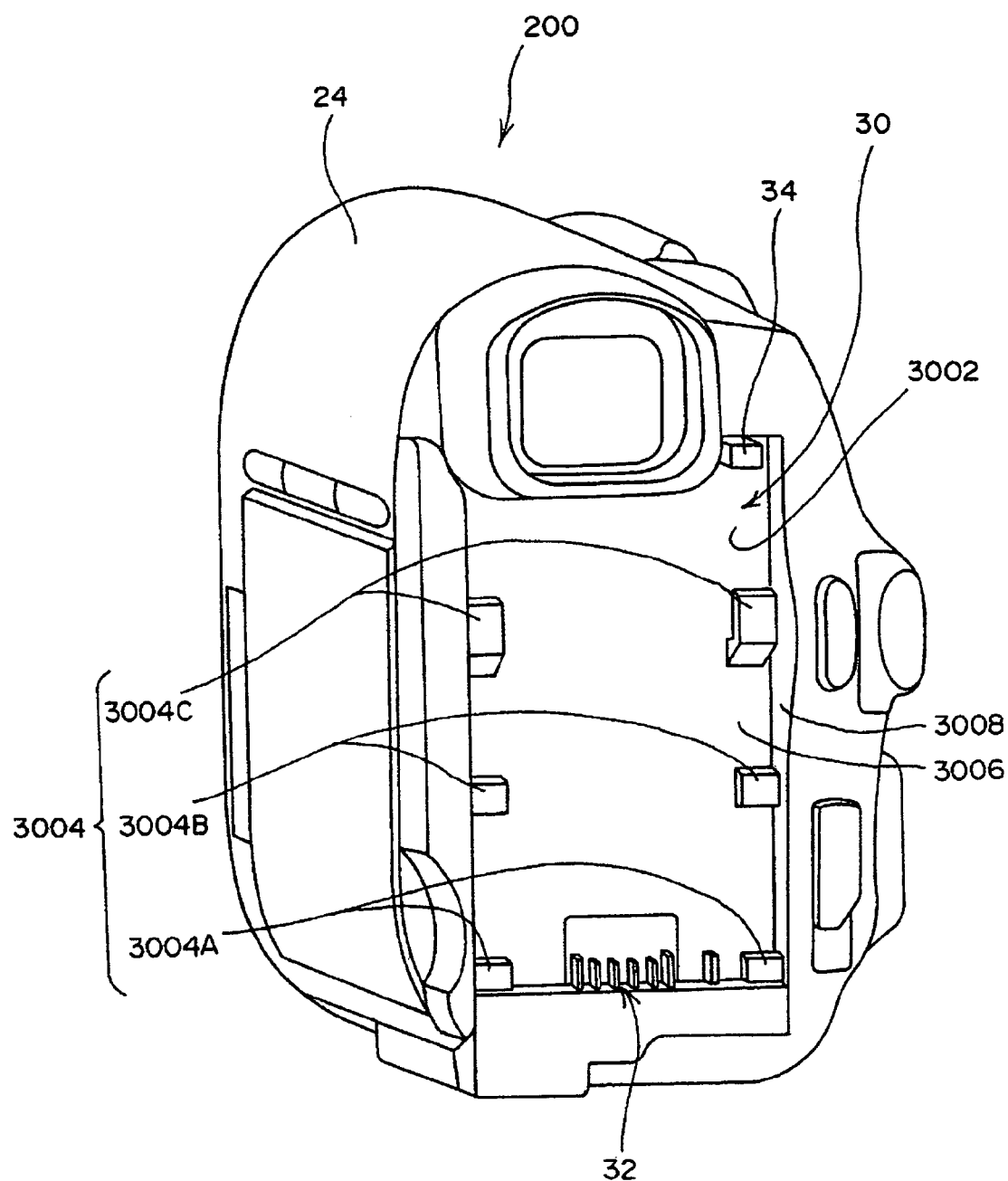
FIG. 11 is an enlarged view of a battery mounting section of the imaging apparatus 200.
Figure 12:
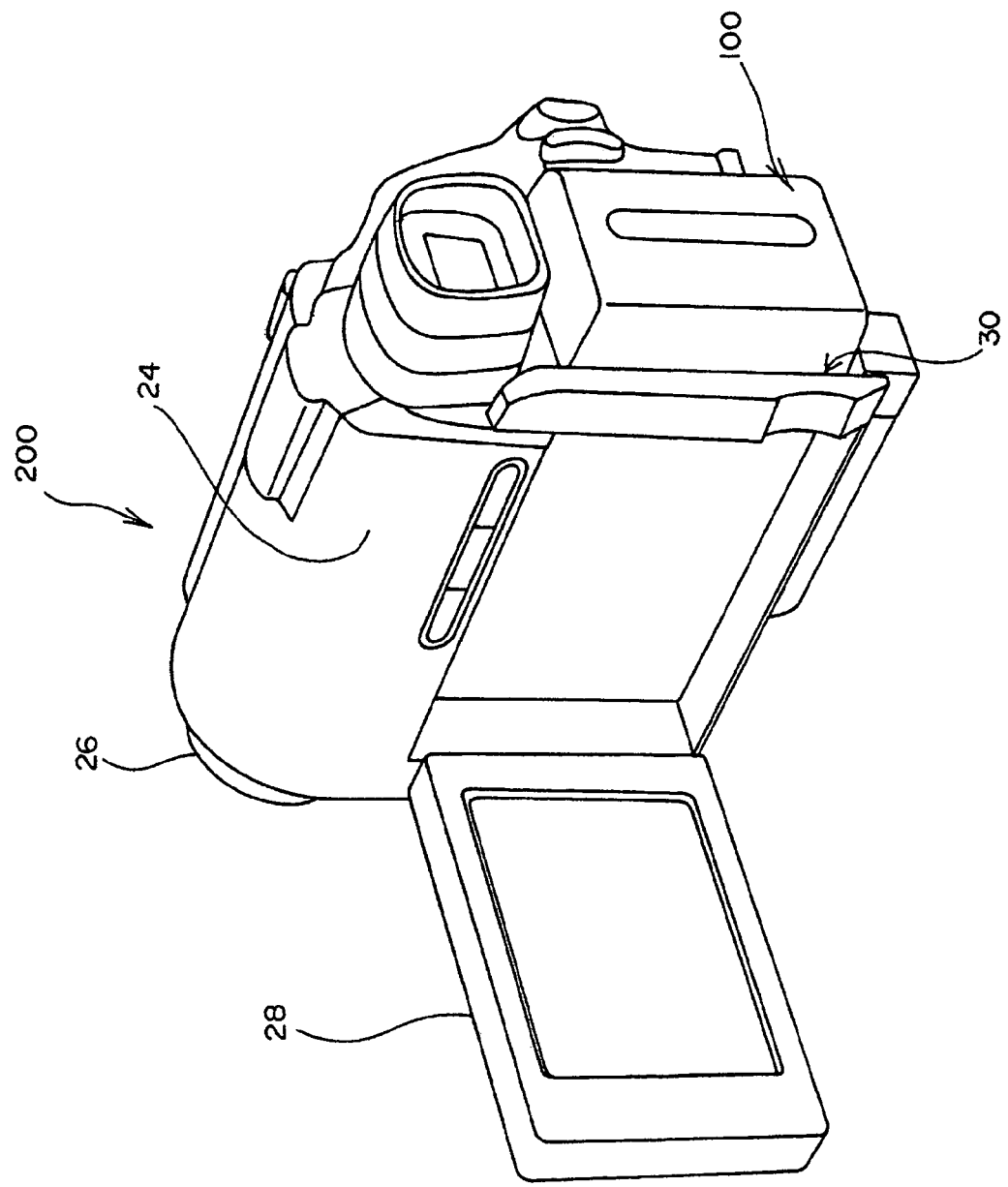
FIG. 12 is a perspective view of the imaging apparatus 200 with the battery apparatus 100 mounted thereon.
Figure 13:
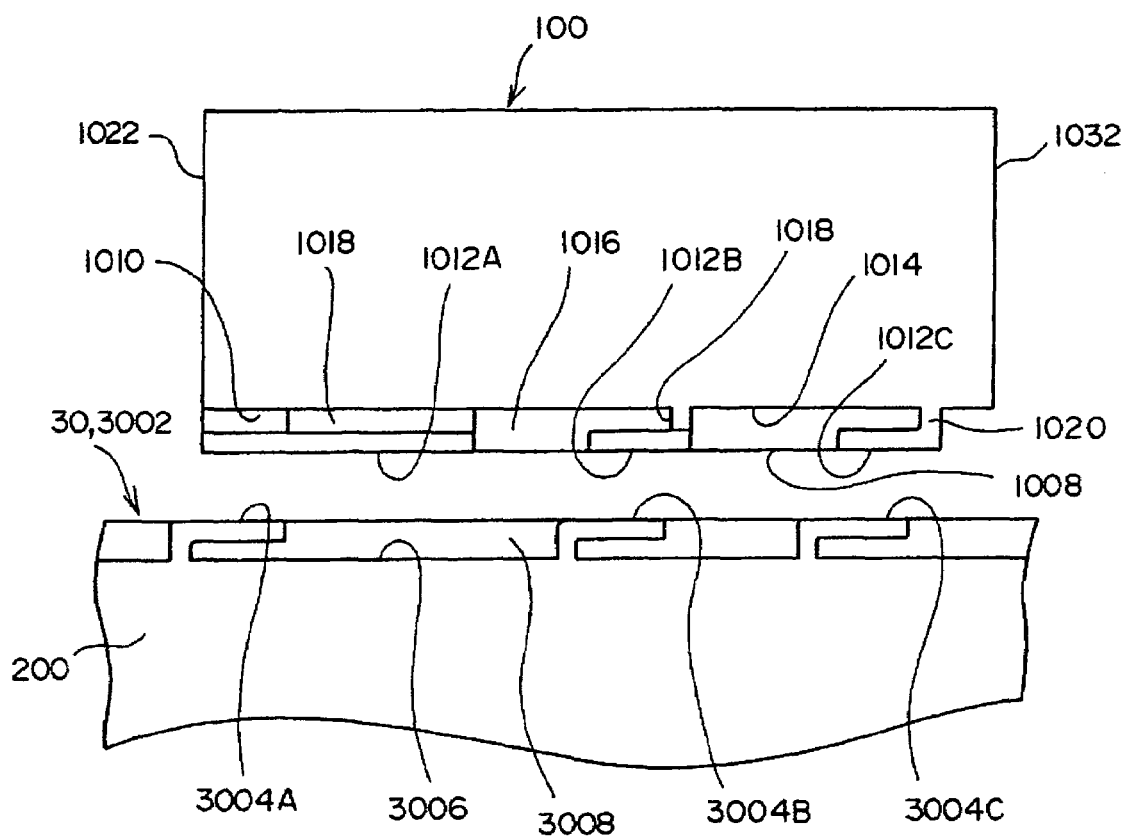
FIG. 13 is an explanatory drawing of a lock mechanism.
Figure 14:
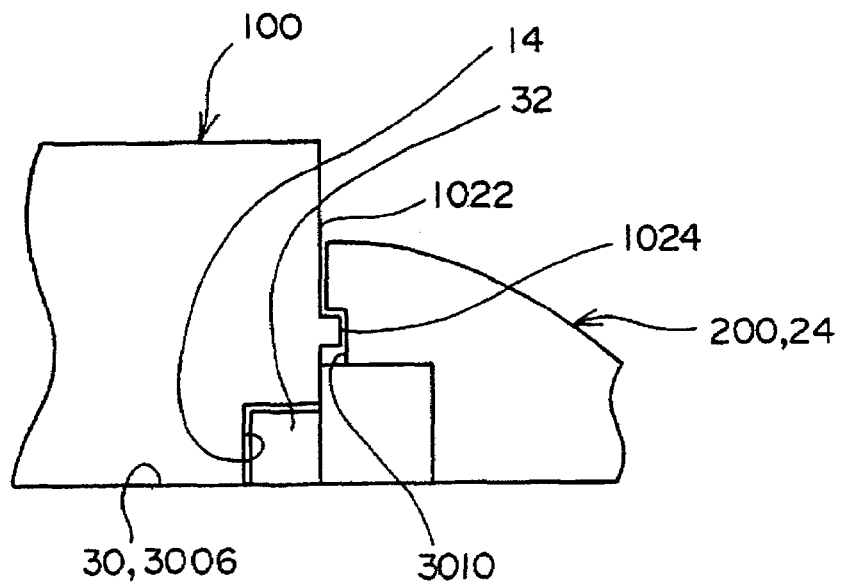
FIG. 14 is an explanatory drawing illustrating the mounting of the battery apparatus 100 onto the battery mounting section.
Figure 15:
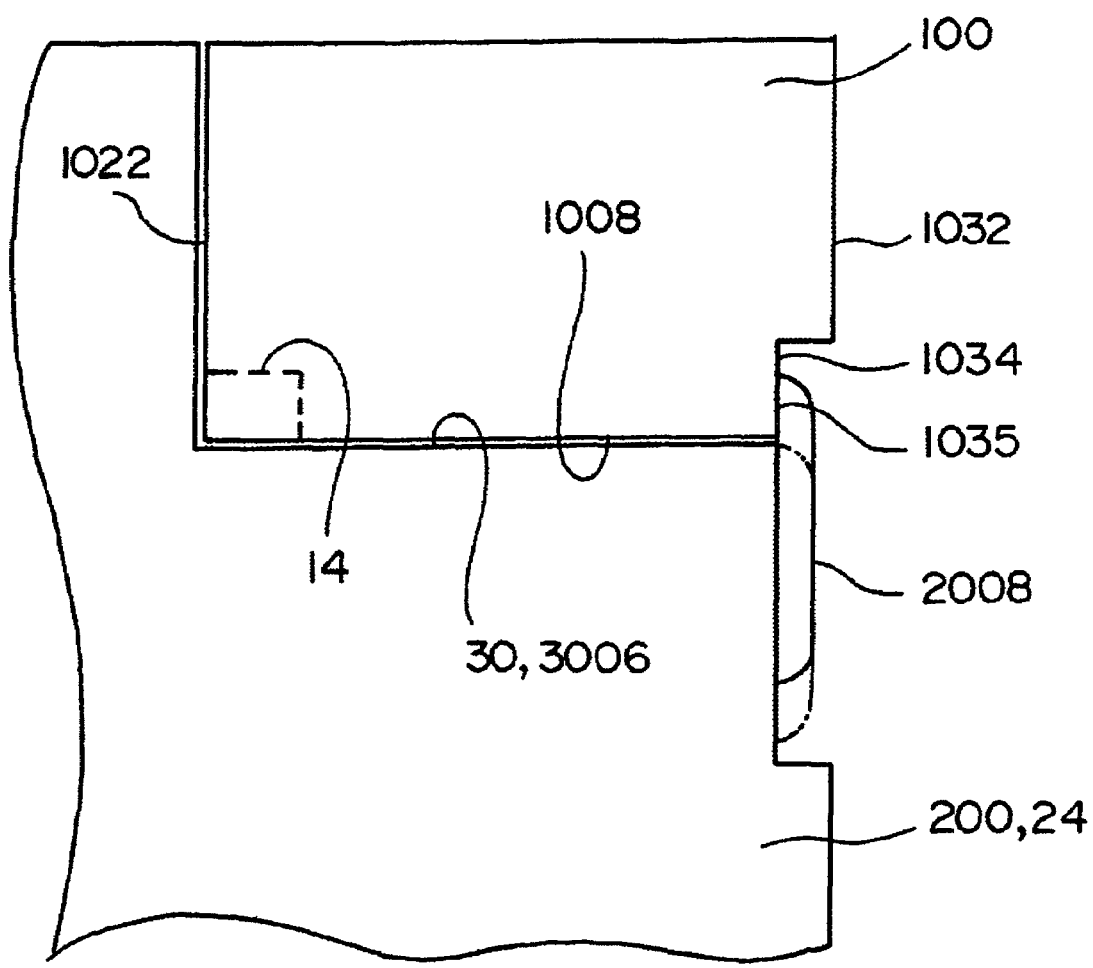
FIG. 15 is an explanatory drawing illustrating the state in which the battery apparatus 100 is mounted on the battery mounting section.

FIG. 10 is a perspective view of the imaging apparatus 200 to which the battery apparatus 100 is attached externally. FIG. 11 is an enlarged view of a battery mounting section of the imaging apparatus 200. FIG. 12 is a perspective view of the imaging apparatus 200 with the battery apparatus 100 attached thereto. FIG. 13 is an explanatory drawing of the mounting of the battery apparatus 100 and the battery mounting section. FIG. 14 is an explanatory drawing of the lock mechanism. FIG. 15 is an explanatory drawing illustrating the state in which the battery apparatus 100 is mounted on the battery mounting section.

As shown in FIG. 10, the imaging apparatus 200 includes a case 24, an optical system 26 incorporated into a front portion of the case 24, an imaging device (not shown) for imaging an image of a subject captured by the optical system 26, a liquid crystal display section 28 for displaying an image taken by the imaging device, a recording/reproducing section (not shown) for recording and/or reproducing an image taken by the imaging device in a record medium, and a battery apparatus 100 for supplying power to the imaging device, the liquid crystal display section 28, and the recording/reproducing section.

A battery mounting section 30, on which the battery apparatus 100 is removably mounted, is disposed at a rear portion of the case 24.

As shown in FIG. 11, the battery mounting section 30 has a recess portion 3002 in which the battery apparatus 100 is housed, a plurality of engaging convex pieces 3004 (3004A, 3004B and 3004C) disposed at the recess portion 3002, an apparatus-side terminal 32 disposed at the recess portion 3002, and an engaging convex portion 34 disposed at a portion of the recess portion 3002 which is the opposite side of the apparatus-side terminal 32.

The recess portion 3002 has a mounting surface 3006, and a side surface 3008 standing from the periphery of the mounting surface 3006.

The mounting surface 3006 is formed in a width corresponding to the width of the bottom surface 1008 of the battery apparatus 100, and a length of a dimension greater than the length of the bottom surface 1008.

As shown in FIGS. 11 and 13, engaging convex pieces 3004 (3004A, 3004B, and 3004C) engageable to the guide groove 1010 are disposed at portions on both sides in the width direction of the mounting surface 3006 and at spaced intervals in the length direction.

The engaging convex portion 34 is arranged to be able to protrude and retract with respect to the mounting surface 3006, and is normally biased in the direction in which it protrudes, so as to be engageable to the cutout portion 1035 of the battery apparatus 100.

The battery apparatus 100 is mounted on the battery mounting section 30 in the following manner.

The battery-side terminal 14 of the battery apparatus 100 is faced into the apparatus-side terminal 32 of the battery mounting section 30, and the bottom surface 1008 of the battery apparatus 10 is faced into the mounting surface 3006 of the battery mounting section 30 such that the respective convex pieces 1012 (1012A, 1012B, and 1012C) of the battery apparatus 100 are respectively positioned apart in the length direction L with respect to the engaging convex pieces 3004 (3004A, 3004B, and 3004C).

In this state, the bottom surface 1008 of the battery apparatus 10 is brought into connection with the mounting surface 3006 of the battery mounting section 30, and the battery apparatus 100 is slid in the direction in which the battery-side terminal 14 approaches the apparatus-side terminal 32.

Thereby, the respective convex pieces 1012 (1012A, 1012B, and 1012C) of the battery apparatus 100 are inserted into between the engaging convex pieces 3004 (3004A, 3004B, and 3004C) and the mounting surface 3006, and the positioning in the thickness direction H of the battery apparatus 100 in the height direction on the battery mounting section 30 is accomplished to provide connection between the battery-side terminal 14 of the battery apparatus 100 and the apparatus-side terminal 32 of the battery mounting section 30.

In this construction, in this embodiment, with the respective convex pieces 1012 (1012A, 1012B, and 1012C) engaged to their respective corresponding engaging convex pieces 3004 (3004A, 3004B, and 3004C), the bottom surface 1008 of the case 10 abuts on the mounting surface 3006 of the battery mounting section 30.

On condition that the end surface 1022 on the battery-side terminal 14 side of the two end surfaces in the length direction L of the battery apparatus 100 abuts on the side surface 3008 of the battery mounting section 30, the engaging convex portion 34 is engaged to the cutout portion 1035 of the battery apparatus 100 and thereby to lock the state in which the battery apparatus 100 is mounted on the battery mounting section 30, thus terminating the mounting of the battery apparatus 100 onto the battery mounting section 30.

Thus, upon the mounting of the battery apparatus 100 on the battery mounting section 30, as shown in FIG. 14, there may leave a gap between the end surface 1022 of the battery-side terminal 14 side of the battery apparatus 100 and a portion of a case 24 of the imaging apparatus 200 opposed to the end surface 1022 (the side surface 3008 of the recess portion 3006).

In this case, such a gap can be filled with the convex portion 1024 by forming a recess groove 3010 in the side surface 3008 of the recess portion 3006 such that the convex portion 1024 of the battery apparatus 100 is inserted into the recess groove 3010. This is advantageous in reliably preventing, for example, foreign matter having conductivity from entering through the above-mentioned gap portion and connecting with a connecting portion between the battery-side terminal 14 and the apparatus-side terminal 32.

If the direction in the length direction of the battery apparatus 100 is not a normal direction when mounting the battery apparatus 100 onto the battery mounting section, the stopper wall 1020 abuts the engaging convex piece 3004A of the battery mounting section 30 thereby to serve the function of avoiding that the mounting of the battery apparatus 100 is mounted in the wrong direction.

Alternatively, as shown in FIG. 15, the case 24 may be provided with a lock claw 2008 that is slid in the direction in which it connects and departs with respect to the cutout portion 1035 of the battery apparatus 100 being mounted on the battery mounting section 30, and is normally biased in the direction in which it approaches the cutout portion 1035 by a biasing member such as a spring. Thus, it is able to arrange such that the engagement between the lock claw 2008 and the cutout portion 1035 prevents the battery apparatus 100 from coming off the battery mounting section 30, and the battery apparatus 100 can be removed from the battery mounting section 30 by releasing the engagement between the cutout portion 1035 of the battery apparatus 100 and the lock claw 2008.

In this case, the cutout portion 1035 of the battery apparatus 100 is displaced toward the inside of the battery apparatus 100 from the end surface 1032, and hence the lock claw 2008 can be disposed at a portion displaced toward the inside of the case 24 from the exterior of the case 24, thus enabling to construct the lock claw 2008 without causing it to project outwardly from the exterior of the case 24 of the imaging apparatus 200. Accordingly, it is advantageous in achieving miniaturization of the imaging apparatus 200 and also improving design characteristic.

Herein, the portion at which the lock claw 2008 is engaged to the cutout portion 1035 is normally biased in the direction in which it approaches the bottom surface 1008 of the battery apparatus 100. Therefore, upon the slide of the bottom surface 1008 of the battery apparatus 100 along the mounting surface 3006 when mounting the battery apparatus 100 on the battery mounting section 30, or when removing the battery apparatus 100 from the battery mounting section 30, the tip of the lock claw 2008 projecting to the bottom surface 1008 abuts the surface of a label, such as the machine name plate 1026 affixed to the bottom surface 1008, by the above-mentioned bias, and the printed portion of the surface of the machine name plate 1026 etc. might be worn off and vanished by friction.

In this case, the lock claw 2008 may be arranged to abut at its tip against the positioning convex portion 1030. Thus, the tip of the lock claw 2008 abuts the positioning convex portion 1030, but does not abut the surface of the machine name plate 1026. Therefore, the surface of the machine name plate 1026 is unsusceptible to damage and dirt, and hence it is advantageous in protecting the printed portion of the surface of the machine name plate 1026. In this construction, the positioning convex portion 1030 may be arranged flush with the surface of the machine name plate 1026, or may be disposed so as to position at the outside of the case 10 from the surface of the machine name plate 1026.

Alternatively, the battery apparatus 100 of this embodiment may be constructed as follows.

Specifically, the battery apparatus 100 has a case 10. The case 10 has two end surfaces 1022 and 1032 positioned at both ends in the length direction L of the case 10, and side surfaces 1006 for connecting the two end surfaces 1022 and 1032. A battery-side terminal 1014 is disposed so as to face at least one selected from either of the end surface 1022 of the two end surfaces 1022 and 1032, and the side surfaces 1006 connected to the end surface 1022. Error insertion preventing grooves extending in the length direction L (the guide grooves 1010) are formed in the side surfaces 1006. Letting the battery-side terminal 1014 side be the front in the length direction L, and the opposite direction be the back, the error insertion preventing groove is opened at a portion toward the battery-side terminal 1014 of both ends in the length direction L (the front end portion), and closed at the opposite side portion (the back end portion). Further, a convex portion 1018 swelling outwardly of the case 10 is formed at the error insertion preventing groove, or two or more convex portions 1018 are formed at spaced intervals in the length direction L.

With this construction, as described with reference to FIG. 9, the identification data of the battery apparatus 100 can be indicated by the position of the convex portions 1018 in the length direction L, or the presence and absence of the convex portions 1018, or the number of the convex portions 1018. In this case, since the convex portions 1018 swell outwardly of the case 10, they do not occupy the space within the case 10. This is advantageous in ensuring the space for housing parts in the inside of the case 10, or achieving miniaturization of the case 10, and also advantageous in improving the degree of freedom of the design of the battery apparatus 100.

Alternatively, in the battery apparatus 100 of this embodiment, the above-mentioned error insertion preventing groove is disposed respectively at the portions on the two side surfaces 1006, which sandwich the case 10 therebetween in the width direction W and are opposed to each other. In this case, by having the two error insertion preventing grooves engaged to their respective corresponding projections, the position of the case 10 in the thickness direction H can be positioned to permit the error insertion preventing grooves to function as positioning grooves.

With this construction, as shown in FIGS. 7 and 8, a battery apparatus having a different dimension in the thickness direction H can be positioned within the battery housing chamber 20 by disposing the respective projections 2002 at the battery housing chamber 20, and engaging the two error insertion preventing grooves to the respective projections 2002.

Alternatively, in the battery apparatus 100 of this embodiment, a plurality of recess portions are formed by a plurality of convex pieces 1012 (1012A, 1012B and 1012C), portions of the side surfaces 1016 which face these convex pieces 1012 (1012A, 1012B and 1012C), respectively, and portions of planes 1014 which face these convex pieces 1012 (1012A, 1012B and 1012C), respectively. These recess portions can constitute the above-mentioned error insertion preventing grooves.

Alternatively, in the battery apparatus 100 of this embodiment, there are disposed convex portions 1018 connecting to the plurality of convex pieces 1012 (1012A, 1012B and 1012C), respectively. The portions at which the respective convex portions 1018 are respectively connected to the plurality of convex pieces 1012 (1012A, 1012B and 1012C) are portions in the length direction L toward the direction in which the battery apparatus 100 is moved (slid) when mounting the battery apparatus 100 on the battery mounting section 30 (i.e., the portions toward the battery-side terminal).

With this construction, when the respective convex pieces 1012 (1012A, 1012B and 1012C) are engaged to and removed from the engaging convex pieces 3004 (3004A, 3004B and 3004C), respective distances in the length direction L are ensured respectively between the convex piece 1012A and the engaging convex portion 3004A, between the convex piece 1012B and the engaging convex piece 3004B, and between the engaging piece 1012C and the engaging convex piece 3004C. Accordingly, when the respective convex pieces 1012 (1012A, 1012B and 1012C) are engaged to and removed from the engaging convex pieces 3004 (3004A, 3004B and 3004C), it is hard to cause interference between the respective engaging convex pieces 3004 and the respective convex portions 1018, and hence it is advantageous in executing smooth mounting and removal of the battery apparatus 100.

While in this embodiment the imaging apparatus is illustrated as an electronic equipment, the present invention is of course applicable to a battery charger for charging a battery apparatus, and a variety of electronic equipments operable with a battery apparatus.

INDUSTRIAL APPLICABILITY

In accordance with the battery apparatus of the present invention, a plurality of types of battery apparatuses, which differ in the thickness of a case, namely, differ in capacity, can be housed in the battery housing chamber because there are formed, at the portions of the case on both sides in a width direction of the battery apparatus, the guide grooves that extend in a length direction and engage the projections disposed at the battery housing chamber thereby to position the position of the case in a thickness direction within the battery housing chamber.

In accordance with the electronic equipment of the present invention, a plurality of types of battery apparatuses, which differ in the thickness of a case, namely, differ in capacity, can be housed in a battery housing chamber because the battery housing chamber is provided with projections that engage the guide grooves of a battery apparatus and position the position in a thickness direction of a case in a height direction within the battery housing chamber.

The invention claimed is:

1. A battery apparatus comprising:
    a case having a width, thickness and length, the case including a body section and bottom section;
    a battery cell housed in the inside of the body section of the case;
    a battery-side terminal disposed at a surface of the case and electrically connected to the battery cell; and
    an identification portion including a recess located on the bottom section,
    wherein guide grooves extending in a length direction are formed at portions of the case on both sides of the bottom section in a width direction, the guide grooves extending in a thickness direction to a plane surface forming an upper surface of the body section, the plane surface extending an entire length of the case, and a width of the bottom section is smaller than a width of the body section.

2. The battery apparatus as cited in claim 1, wherein
    portions at both sides in the width direction of the case are formed as side surfaces parallel to each other and extending in the length direction;
    one of surfaces in the thickness direction of the case is formed as a bottom surface;
    the battery-side terminal is provided at an end portion of the case in the length direction of the case; and
    the guide grooves are formed at the side surface portions and close to the bottom surface.

3. The battery apparatus as cited in claim 1, wherein
    one of surfaces in the thickness direction of the case is formed as a bottom surface;
    the battery-side terminal is provided at an end portion in the length direction of a bottom portion;
    movement of the battery apparatus toward the bottom surface of the battery housing chamber is restricted by mounting the bottom surface of the case on the bottom surface of the battery housing chamber; and
    movement of the battery apparatus in the direction away from the bottom surface of the battery housing chamber is restricted by engaging the projection of the battery housing chamber with the guide grooves, when the battery apparatus is housed in the battery housing chamber.

4. The battery apparatus as cited in claim 1, wherein
    the case includes a main body portion extending in the length direction with a uniform size in the width direction, and a bottom portion provided at one of thickness directions at a central portion in the width direction and extending in the length direction with a smaller width size than the width of the main body portion;
    one of surfaces in the thickness direction of the case is formed as a bottom surface by a surface of the bottom portion;
    the battery-side terminal is provided at an end portion in the length direction of the bottom portion;
    convex pieces are formed to be projected outwardly in the width direction from bottom surface portions of both sides in the width direction; and the guide grooves are formed with the convex pieces, side surfaces of the bottom portion positioned at both sides in the width direction, and a surface where the main body portion is facing the side surface.

5. The battery apparatus as cited in claim 4, wherein
a convex portion projecting outwardly from the side surface in the width direction is provided at side face of the bottom portion and at portions with regular intervals;
the convex portion is formed with a smaller projecting size than the convex piece; and
movement of the battery apparatus in the width direction is restricted by contacting the convex portion and the projection while the projection is engaging with the guide groove.

6. The battery apparatus as cited in claim 1, wherein
one of surfaces in the thickness direction of the case is formed as a bottom surface;
the battery-side terminal is provided at an end portion in the length direction of the bottom surface; and
a stopper barrier for sealing the guide groove is provided at a portion of the case opposite to a portion where the battery-side terminal is provided in the length direction.

7. The battery apparatus as cited in claim 1, further comprising:
a convex portion projecting in the length direction from an end surface of the case and extending in the width direction along the end surface of the case.

8. The battery apparatus as cited in claim 7, wherein
the battery-side terminal is provided at an end portion in the length direction of a bottom portion, and the convex portion extends in the width direction above the battery-side terminal.

9. The battery apparatus as cited in claim 1, further comprising:
an identification portion including a projection having a size that corresponds with an electrical characteristic of the battery, the electrical characteristic is at least one of a capacity, a charging current value, and whether the battery apparatus includes a quick charge capability.

10. The battery apparatus as cited in claim 1, further comprising:
a cutout portion formed in an end of a bottom surface of the case, the cutout portion configured to receive a locking device of the battery housing chamber.

11. The battery apparatus as cited in claim 10, wherein
the battery-side terminal is provided at an opposite end portion in the length direction of the bottom surface.

12. The battery apparatus as cited in claim 1, wherein the bottom surface also includes a recess portion.

13. The battery apparatus as cited in claim 12, further comprising:
a convex portion in the recess portion; and
a machine name plate located in the recess portion and including a positioning groove receiving the convex portion of the recess portion.

14. A battery apparatus comprising:
a case having a width, thickness and length, the case including a body section and a bottom section;
a battery cell housed in the inside of the body section of the case;
a battery-side terminal disposed at a surface of the case and electrically connected to the battery cell, the battery side terminal including both a positive and negative electrode and located proximate an edge where a first end surface and a bottom surface of the bottom section meet, the battery side terminal located a substantially equal distance from both sides in a width direction; and
an identification portion including a recess located on the bottom section,
wherein guide grooves extending in a length direction are formed at portions of the case on both sides of the bottom section in the width direction, the guide grooves extending in a thickness direction to a plane surface forming an upper surface of the body section, the plane surface extending an entire length of the case, and a width of the bottom section is smaller than a width of the body section.

15. The battery apparatus as cited in claim 14, further comprising:
a convex portion projecting in the length direction from the first end surface of the case and extending in the width direction along the first end surface of the case.

16. The battery apparatus as cited in claim 15, wherein the convex portion extends in the width direction above the battery-side terminal on a top side of the terminal.

17. The battery apparatus as cited in claim 14, further comprising:
an identification portion including a projection having a size that corresponds with an electrical characteristic of the battery, the electrical characteristic is at least one of a capacity, a charging current value, and whether the battery apparatus includes a quick charge capability.

18. The battery apparatus as cited in claim 14, further comprising:
a cutout portion formed in a second end surface proximate a bottom surface of the case, the cutout portion configured to receive a locking device of the battery housing chamber, the cutout portion extending in the width direction along an entire width of the first end surface of the battery.

19. The battery apparatus as cited in claim 14, further comprising:
a recess portion in the bottom surface of the case;
a convex portion in the recess portion; and
a machine name plate located in the recess portion and including a positioning groove receiving the convex portion of the recess portion.

20. The battery apparatus as cited in claim 14, further comprising:
a second identification portion including a second recess having a size that corresponds with an electrical characteristic of the battery, the electrical characteristic is at least one of a capacity, a charging current value, and whether the battery apparatus includes a quick charge capability, the second identification portion located in the first end surface to an other side of the battery-side terminal proximate the edge where the first end surface and the bottom surface meet.

21. The battery apparatus as cited in claim 14, further comprising:
an identification portion including a recess having a size determined by a value of an electrical characteristic of the battery apparatus, the size identifying a predetermined value of the electrical characteristic of the battery apparatus, the electrical characteristic is at least one of a capacity, a charging current value, and whether the battery apparatus includes a quick charge capability, the identification portion located in the first end surface to one side of the battery-side terminal proximate the edge where the first end surface and the bottom surface meet.

22. The battery apparatus as cited in claim 1, wherein the recess has a size determined by a value of an electrical characteristic of the battery apparatus, the size identifying a predetermined value of the electrical characteristic of the battery apparatus, the electrical characteristic is at least one of a capacity, a charging current value, and whether the battery apparatus includes a quick charge capability.

23. The battery apparatus as cited in claim 1, wherein the battery-side terminal and the guide grooves are substantially a same distance in the thickness direction from the bottom section.

24. The battery apparatus as cited in claim 14, wherein the battery-side terminal and the guide grooves are substantially a same distance in the thickness direction from the bottom section.

* * * * *